(12) United States Patent
Bradley et al.

(10) Patent No.: US 7,958,180 B2
(45) Date of Patent: Jun. 7, 2011

(54) MULTIPLIER ENGINE

(75) Inventors: Douglas H. Bradley, Austin, TX (US);
Owen Chiang, Austin, TX (US);
Sherman M. Dance, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 11/773,558

(22) Filed: Jul. 5, 2007

(65) Prior Publication Data

US 2009/0013022 A1 Jan. 8, 2009

(51) Int. Cl.
*G06F 7/52* (2006.01)
(52) U.S. Cl. ........................................ 708/620
(58) Field of Classification Search ........... 708/620–632
See application file for complete search history.

(56) References Cited

U.S. PATENT DOCUMENTS

| | | | | |
|---|---|---|---|---|
| 5,220,525 A * | 6/1993 | Anderson et al. | ............. | 708/631 |
| 5,677,863 A * | 10/1997 | Naffziger | .................... | 708/628 |
| 5,748,517 A | 5/1998 | Miyoshi et al. | | |
| 5,847,981 A * | 12/1998 | Kelley et al. | .................. | 708/603 |
| 6,035,316 A * | 3/2000 | Peleg et al. | ..................... | 708/523 |
| 6,366,944 B1 * | 4/2002 | Hossain et al. | ............... | 708/628 |
| 6,763,367 B2 * | 7/2004 | Kwon et al. | .................. | 708/620 |
| 7,313,585 B2 * | 12/2007 | Winterrowd | .................. | 708/629 |
| 7,640,286 B2 * | 12/2009 | Lutz et al. | ..................... | 708/620 |
| 2003/0158879 A1 * | 8/2003 | Kwon et al. | .................. | 708/603 |
| 2004/0148321 A1 * | 7/2004 | Guevorkian et al. | .......... | 708/233 |
| 2005/0144216 A1 * | 6/2005 | Simkins et al. | ............... | 708/620 |
| 2005/0273485 A1 * | 12/2005 | Kershaw et al. | ............. | 708/700 |
| 2008/0098057 A1 * | 4/2008 | Takeuchi et al. | .............. | 708/523 |

* cited by examiner

*Primary Examiner* — Chat C Do
(74) *Attorney, Agent, or Firm* — Stephen J. Walder, Jr.; Matthew B. Talpis

(57) ABSTRACT

A multiplier engine that reduces the size of the circuitry used to provide the multiplier engine, as well as increases the speed at which the multiplication algorithm is performed, are provided. The illustrative embodiments may comprise a M*8 multiplication engine having one or more 4:2 compressors that comprise only two full adders, as opposed to the three full adders in the known 5:2 compressor based architecture. The 4:2 compressors are able to achieve the same operation as the known 5:2 compressor based architecture by virtue of using the unused bits in a least significant portion of the partial product inputs to store the negate bit values. Moreover, a negate bit value that is not fused with the partial product inputs may be input to the 4:2 compressors for a bit 0 position.

16 Claims, 5 Drawing Sheets

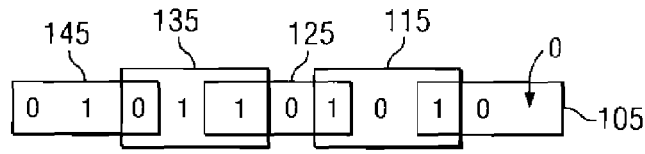
FIG. 1A
(PRIOR ART)
| MULTIPLIER 3-BIT BLOCK | PARTIAL PRODUCT | BOOTH DECODER OUTPUT SIGNAL | | | | | NEGATE BIT |
|---|---|---|---|---|---|---|---|
| | | 0 TERM | +1B TERM | +2B TERM | -2B TERM | -1B TERM | |
| 000 | 0 | 1 | 0 | 0 | 0 | 0 | 0 |
| 001 | +1B | 0 | 1 | 0 | 0 | 0 | 0 |
| 010 | +1B | 0 | 1 | 0 | 0 | 0 | 0 |
| 011 | +2B | 0 | 0 | 1 | 0 | 0 | 0 |
| 100 | -2B | 0 | 0 | 0 | 1 | 0 | 1 |
| 101 | -1B | 0 | 0 | 0 | 0 | 1 | 1 |
| 110 | -1B | 0 | 0 | 0 | 0 | 1 | 1 |
| 111 | 0 | 1 | 0 | 0 | 0 | 0 | 0 |
FIG. 1B
(PRIOR ART)
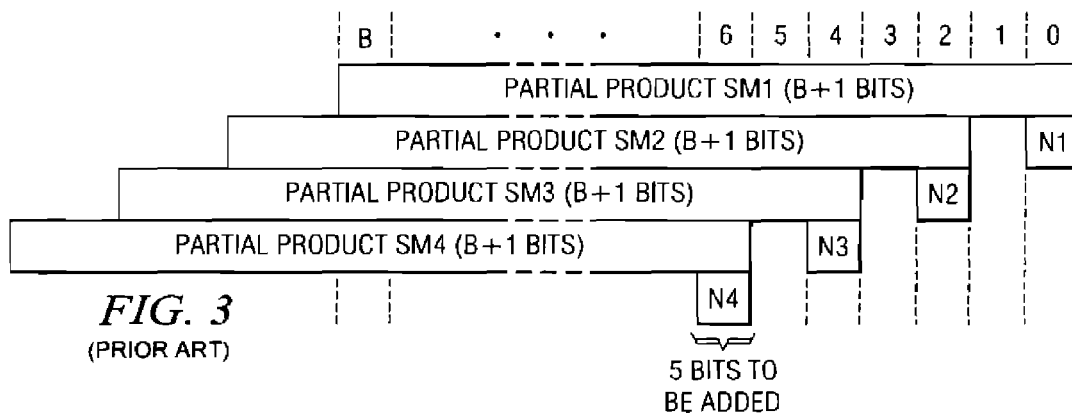
FIG. 3
(PRIOR ART)

MULTIPLIER ENGINE

BACKGROUND

1. Technical Field

The present application relates generally to an improved multiplier engine apparatus and method. More specifically, the present application is directed to a multiplier engine that reduces the size of the circuitry used to provide the multiplier engine as well as increases the speed at which the multiplication algorithm is performed.

2. Description of Related Art

In 1951, Andrew D. Booth, while doing research on crystallography at Birkbeck College in Bloomsbury, London invented an algorithm for performing multiplication of two signed numbers in two's complement notation. Booth used desk calculators that were faster at shifting than adding and created the algorithm to increase their speed.

Booth's multiplication algorithm may be described as follows. If x is the count of bits of the multiplicand, i.e. a quantity that is multiplied by another quantity (the multiplier), and y is the count of bits of the multiplier:

(1) Draw a grid of three lines, each with squares for x+y+1 bits. Label the lines respectively A (add), S (subtract), and P (product);

(2) In two's complement notation, fill the first x bits of each line with:
 A: the multiplicand
 S: the negative of the multiplicand
 P: zeros (3) Fill the next y bits of each line with:
 A: zeros
 S: zeros
 P: the multiplier (4) Fill the last bit of each line with a zero.

(5) Do the following two steps |y| (Absolute value of y) times:
 a) If the last two bits in the product are:
  00 or 11: do nothing
  01: P=P+A. Ignore any overflow.
  10: P=P+S. Ignore any overflow.
 b) Arithmetically shift the product right one position.

(6) Drop the last bit from the product for the final result.

The following is an example of the implementation of Booth's multiplication algorithm. Assume that one wants to find the result of 3×−4, where 3 is the multiplicand and −4 is the multiplier. Performing steps 1-4 of the Booth multiplication algorithm, the result achieved is as follows:
 A=0011 0000 0
 S=1101 0000 0
 P=0000 1100 0

Performing the fifth step of Booth's algorithm requires four iterations through the loop as follows:
 P=0000 1100 0. The last two bits are 00.
 P=0000 0110 0. A right shift.
 *end of first iteration*
 P=0000 0110 0. The last two bits are 00.
 P=0000 0011 0. A right shift.
 *end of second iteration*
 P=0000 0011 0. The last two bits are 10.
 P=1101 0011 0. P=P+S.
 P=1110 1001 1. A right shift.
 *end of third iteration*
 P=1110 1001 1. The last two bits are 11.
 P=1111 0100 1. A right shift.

Thus, the product of 3×−4 is 1111 0100, which is equal to −12.

In order to understand why Booth's multiplication algorithm works, consider a positive multiplier consisting of a block of 1s surrounded by 0s, e.g., 00111110. The product is given by:

$$M \times \text{``00111110''} = M \times (2^5+2^4+2^3+2^2+2^1) = M \times 62$$

where M is the multiplicand. The number of operations can be reduced to two by rewriting the same product as:

$$M \times \text{``010000-10''} = M \times (2^6-2^1) = M \times 62$$

The product can then be generated by one addition and one subtraction of the multiplicand. This scheme can be extended to any number of blocks of 1s in a multiplier, including the case of a single 1 in a block.

Thus, Booth's multiplication algorithm follows this scheme by performing an addition when it encounters the first digit of a block of ones (01) and a subtraction when it encounters the end of the block of ones (10). This works for a negative multiplier as well. When the ones in a multiplier are grouped into long blocks, Booth's algorithm performs fewer additions and subtractions than a normal multiplication algorithm.

With regard to computer architecture, the Booth multiplication algorithm is a technique that allows for smaller, faster multiplication circuits in computing devices, by recoding the numbers that are multiplied. It is the standard technique used in chip design and provides significant improvements over the "long multiplication" technique.

The standard "long multiplication" technique involves performing, for each column in the multiplier, a shift of the multiplicand by an appropriate number of columns and multiplying it by a value of the digit in that column of the multiplier to obtain a partial product. The partial products may then be added to obtain the final result. With such a system, the number of partial products is exactly the number of columns in the multiplier.

The number of partial products may be reduced by one half by using a technique known as radix 4 Booth recoding. The basic idea is that instead of shifting and adding for every column of the multiplier term and multiplying by 1 or 0, every second column is taken and multiplied by ±1, ±2, or 0 to obtain the same results. Thus, to multiply by 7, one can multiply the partial product aligned against the least significant bit by −1, and multiply the partial product aligned with the third column by 2:
 Partial Product 0=Multiplicand*−1, shifted left 0 bits (x −1).
 Partial Product 1=Multiplicand*2, shifted left 2 bits (x 8).
This is the same result as the equivalent shift and add method as shown below:
 Partial Product 0=Multiplicand*1, shifted left 0 bits (x 1).
 Partial Product 1=Multiplicand*1, shifted left 1 bit (x 2).
 Partial Product 2=Multiplicand*1, shifted left 2 bits (x 4).
 Partial Product 3=Multiplicand*0, shifted left 3 bits (x 0).
The halving of the number of partial products is important in circuit design as it relates to the propagation delay in the running of the circuit as well as the complexity and power consumption of the circuits.

Moreover, it is also important to note that there is comparatively little complexity penalty in multiplying by 0, 1 or 2. All that is needed is a multiplexer, or the equivalent, which has a delay time that is independent of the size of the inputs. Negating two's complement numbers has the added complication of needing to add a "1" to the least significant bit, but this can be overcome by adding a single correction term with the necessary "1"s in the correct positions.

To Booth recode the multiplier term, the bits of the multiplier term are considered in blocks of three such that each block overlaps the previous block by one bit, as shown in FIG. 1A. Grouping of bits starts from the least significant bit with the first block 105 only using two bits of the multiplier, since there is no previous block to overlap. The overlap of the blocks 105-145 is necessary so that it can be known what happened in the last block, as the most significant bit of the block acts like a sign bit. Since the least significant bit of each block is used to know what the sign bit was in the previous block, and there are never any negative products before the least significant block, the least significant bit of the first block 105 is always assumed to be 0.

After having grouped the bits into three-bit blocks, the Booth decoder truth table shown in FIG. 1B is then consulted to determine what the encoding will be for each block. In the Booth decoder truth table of FIG. 1B, the multiplicand is B and the multiplier is A (thus, the truth table is for multiplication of B*A). For each iteration of Booth recoding, the three-bit blocks of the multiplier are used to generate a partial product. For example, when the three-bit block is "010", the partial product is +1B, i.e. +1*Multiplicand, as shown in the second column of FIG. 1B. Each of the three-bit blocks of the multiplier are used to generate partial products which are then added to obtain the resulting value of the multiplication operation.

FIG. 2 illustrates a known multiplier circuit arrangement for realizing Booth's multiplication algorithm and which utilizes the three-bit blocks and truth table described above. This multiplier circuit is described in U.S. Pat. No. 5,748,517, which is hereby incorporated by reference.

As shown in FIG. 2, Booth decoders BD1-BD3 receive overlapping three bits of a 6-bit multiplier Y (Y0-Y5), respectively. That is to say, the Booth decoder BD1 receives "0", Y0, Y1, the Booth decoder BD2 receives Y1, Y2, Y3, and the Booth decoder BD3 receives Y3, Y4, and Y5. The Booth decoders BD1-BD3 output partial product information groups S1-S5 to partial product generating circuits PP1-PP3 on the basis of the received three bits of the multiplier Y, respectively.

The partial product generating circuits PP1-PP3 receive the partial product information groups S1-S5 from the Booth decoders BD1-BD3, respectively, and an 8-bit multiplicand X (I0-I7). The partial product generating circuits PP1-PP3 output partial products SM1-SM3 to a partial product adder circuit ADD1. The partial product adder circuit ADD1 adds SM1-SM3 to output a multiplication result XY of the multiplier Y and the multiplicand X.

The partial product adder circuit ADD1 must be of sufficient size as to permit the adding of the outputs SM1-SM3 of the partial product generation circuits PP1-PP3. Because the partial product adder circuit ADD1 must account for the possibility that the partial products may be negative, negate bits must be included in the addition performed by the partial product adder circuit ADD1. As a result, the partial product adder circuit ADD1 has an increased size to accommodate the negate bits. This increase in size further causes the partial product adder circuit ADD1 to be relatively slow.

To illustrate this problem in known adder circuits, consider a M*N bit Booth integer multiplier, where in this case the value for N is 8 bits. As discussed above, in order to perform the Booth multiplication, one must generate the 0, +/−1B, and +/−2B terms, where B is the multiplicand. In two's complement binary representation, the −1B and −2B terms are generated by bitwise inversion plus 1 at the least significant bit. For example:

$$5 = 0101$$
$$-5 = 1010$$
$$+1$$
$$= 1011$$

In an M*8 Booth multiplication, the 4 partial products have the format as shown in FIG. 3. These 4 partial products are referred to as SM1, SM2, SM3, and SM4 and are generated by corresponding partial product generating circuits PP1-PP4. The 4 partial products have B+1 bits, where B is the bit size of the multiplicand. The 4 negate bits N1, N2, N3 and N4 are associated with these 4 partial products SM1-SM4, respectively. The N1 is placed at bit 0 position. Its value is $N1*2^1$. Similarly, N2, N3 and N4 are placed at the bit 2, 4 and 6 positions. Their values are $N2*2^2$, $N3*2^3$, and $N4*2^4$, respectively. If a partial product is a positive term, such as 0, +1B, or +2B, the negate bit N will be 0. If a partial product is a negative term, such as −1B or −2B, the negate bit will be 1.

It should be noted that the greatest number of terms to be summed are the 5 terms at the bit 6 position in FIG. 3. These 5 terms need to be summed by an adder circuit when generating the multiplication result, e.g., by partial product adder circuit ADD1. In order to perform such summing of the 5 terms, a 5:2 compressor is used to generate carry and sum terms. The 5:2 compressor circuit has a configuration as shown in FIG. 4.

As shown in FIG. 4, the 5:2 compressor circuit requires 3 full adders 410-430 to handle all 5 inputs. The first full adder 410 adds the first partial product SM1, the second partial product SM2, and the third partial product SM3 (which is the carry in value for the full adder). The first full adder 410 generates a sum value that is output to the second full adder 420 and a carry-out value side_cout1 which is input to the third full adder 430 as side_cin1. The second full adder 420 adds the sum from the first full adder 410 with the fourth partial product SM4 and the fourth negate value N4. The second full adder 420 generates a sum value that is output to the third full adder 430 and a carry-out value side_cout2 which is input to the third full adder 430 as side_cin2. The third full adder 430 adds the sum from the second full adder 420 with the first carry-out value and the second carry-out value and generates a multiplication result sum value and result carry-out value.

The circuit shown in FIG. 4 is relatively large and slow operating. It would be beneficial to be able to reduce the size of the adder circuitry as well as increase the speed by which the addition of the partial products to generate the multiplication result is performed.

SUMMARY

The illustrative embodiments provide a multiplier engine that reduces the size of the circuitry used to provide the multiplier engine as well as increases the speed at which the multiplication algorithm is performed. For example, the illustrative embodiments remove the extra $5^{th}$ term, i.e. the N4 term, that typically needs to be added in a 5:2 compressor of a multiplication engine. The illustrative embodiments may comprise a M*8 multiplication engine having one or more 4:2 compressors that comprise only two full adders, as opposed to the three full adders in the known 5:2 compressor based architecture. As a result, the M*8 multiplication engine of the illustrative embodiments may have a reduced size and operate more quickly since one full adder may be eliminated from the compressor circuitry of the M*8 multiplication engine.

In one illustrative embodiment, a multiplication apparatus is provided that comprises a compressor circuit and an accumulator coupled to the compressor circuit. The compressor circuit may receive two or more partial products of a multiplication operation as inputs, the two or more partial products having at least one first negate bit fused therein. The compressor circuit may add the two or more partial products with the fused at least one first negate bit to each other to generate a first sum output value and a first carry-out output value that are input to the accumulator. The accumulator may receive the first sum output value, the first carry-out output value, and a second negate bit as inputs and generate a second sum output value and second carry-out output value based on the first sum output value, the first carry-out output value, and the second negate bit.

The multiplication apparatus may further comprise staging registers coupled to the accumulator. The staging registers may store the second sum output value and the second carry-out output value that is output by the accumulator. The staging registers may output the second sum output value and the second carry-out output value as previous stage inputs to the accumulator. The accumulator may generate the second sum output value and the second carry-out output value based on the previous stage inputs.

The multiplication apparatus may further comprise an adder circuit coupled to the staging registers. The staging registers may output the second sum output value and the second carry-out output value to the adder circuit. The adder circuit may generate a multiplication result based on the second sum output value and the second carry-out output value.

At least one first negate bit may be fused in the two or more partial products at an unused least significant bit portion of the two or more partial products. At least one first negate bit may comprise a first negate bit, a third negate bit, and a fourth negate bit. The first negate bit may be provided at a bit zero position of a second partial product input to the compressor circuit, the third negate bit may be provided at a bit one position of the second partial product and bits three, two, and one of a third partial product input to the compressor circuit, and the fourth negate bit may be provided at a bit zero position of the third partial product and bits five, four, three, two, one, and zero of a fourth partial product input to the compressor circuit.

The second negate bit may be provided at a bit zero position of the second carry-out output value. The second negate bit may be input to the compressor circuit and the compressor circuit may add the second negate bit to the two or more partial products with the fused at least one first negate bit to each other to generate the first sum output value and the first carry-out output value that are input to the accumulator.

In another illustrative embodiment, a method of providing a multiplication apparatus is provided. The method may comprise providing a compressor circuit and providing an accumulator coupled to the compressor circuit. The compressor circuit and accumulator may operate in the manner described above with regard to the apparatus illustrative embodiment. Moreover, the method may further comprise providing stating registers coupled to the accumulator and providing an adder circuit coupled to the staging registers. The staging registers and adder circuit may also operate in the manner previously described above with regard to the apparatus illustrative embodiment.

In yet another illustrative embodiment, a method for generating a multiplication result is provided. The method may comprise receiving, in a compressor circuit, two or more partial products of a multiplication operation, the two or more partial products having at least one first negate value fused therein. The method may further comprise adding, in the compressor circuit, the two or more partial products with the fused at least one first negate value to each other to generate a first sum and a first carry-out output value. Moreover, the method may comprise accumulating, in an accumulator circuit, the first sum output value, the first carry-out output value, a second negate bit, a second sum output value from a first staging register, and a second carry-out output value from a second staging register. Furthermore, the method may comprise generating a multiplication result based on the accumulated first sum output value, first carry-out output value, second negate bit, second sum output value, and second carry-out output value.

The method may further comprise adding the second sum output value and the second carry-out output value in an adder circuit. The adder circuit may output the multiplication result based on the addition of the second sum output value and the second carry-out output value.

The at least one first negate bit may be fused in the two or more partial products at an unused least significant bit portion of the two or more partial products. The at least one first negate bit may comprise a first negate bit, a third negate bit, and a fourth negate bit. The first negate bit may be provided at a bit zero position of a second partial product input to the compressor circuit. The third negate bit may be provided at a bit one position of the second partial product and bits three, two, and one of a third partial product input to the compressor circuit. The fourth negate bit may be provided at a bit zero position of the third partial product and bits five, four, three, two, one, and zero of a fourth partial product input to the compressor circuit.

The second negate bit may be provided at a bit zero position of the second carry-out output value. The second negate bit may be input to the compressor circuit. The compressor circuit may add the second negate bit to the two or more partial products with the fused at least one first negate bit to each other to generate the first sum output value and the first carry-out output value that are input to the accumulator.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A is an exemplary diagram illustrating overlapping three-bit blocks of a multiplier in accordance with a known Booth decoder methodology;

FIG. 1B is an exemplary diagram of a partial product truth table for a Booth decoder in accordance with a known methodology;

FIG. 3 is an exemplary diagram illustrating a format for adding 4 partial products having corresponding negate bit values in accordance with a known mechanism;

DETAILED DESCRIPTION OF THE PREFERRED EMBODIMENTS

The illustrative embodiments provide a multiplier engine that reduces the size of the circuitry used to provide the multiplier engine as well as increases the speed at which the multiplication algorithm is performed. The reduction in size and increase in speed are achieved by fusing the negate bits of the partial products generated by partial product generation circuitry implementing the Booth multiplication algorithm into unused areas in the partial products. By fusing the negate bits into these unused areas, one or more terms that need to be handled by compression circuitry may be eliminated and, as a result, the compression circuitry may be made smaller in size and require less time to perform its operation. This, in effect, reduces the size of the multiplier engine and increases the speed at which the multiplier engine operates.

Figure 4:
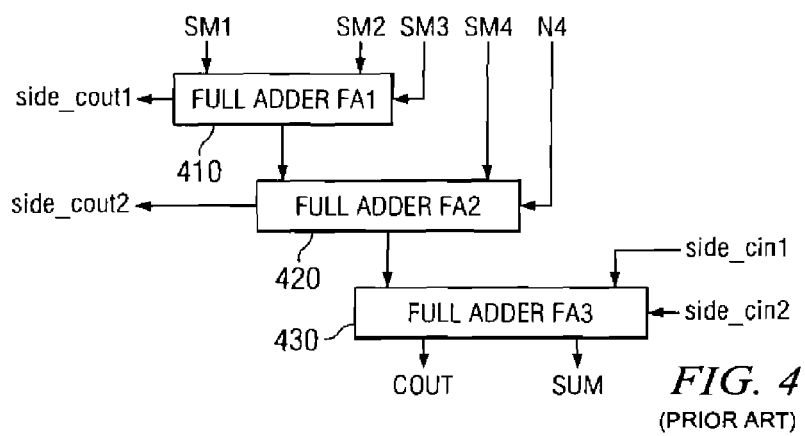
FIG. 4 is an exemplary diagram illustrating a 5:2 compressor for performing addition of partial products for generating a multiplication result in accordance with a known mechanism.

In one illustrative embodiment, a $5^{th}$ term, i.e. the negate bit N4 term, that typically needs to be processed by a 5:2 compressor of the multiplication engine may be effectively removed as a separate input to the multiplication engine (see FIGS. 3 and 4 above). One illustrative embodiment may comprise a M*8 multiplication engine having one or more 4:2 compressors that comprise only two full adders, as opposed to the three full adders in the known 5:2 compressor based architecture (see FIG. 4 above). As a result, the M*8 multiplication engine of the illustrative embodiments may have a reduced size and operate more quickly since one full adder may be eliminated from the compressor circuitry of the M*8 multiplication engine.

Figure 2:
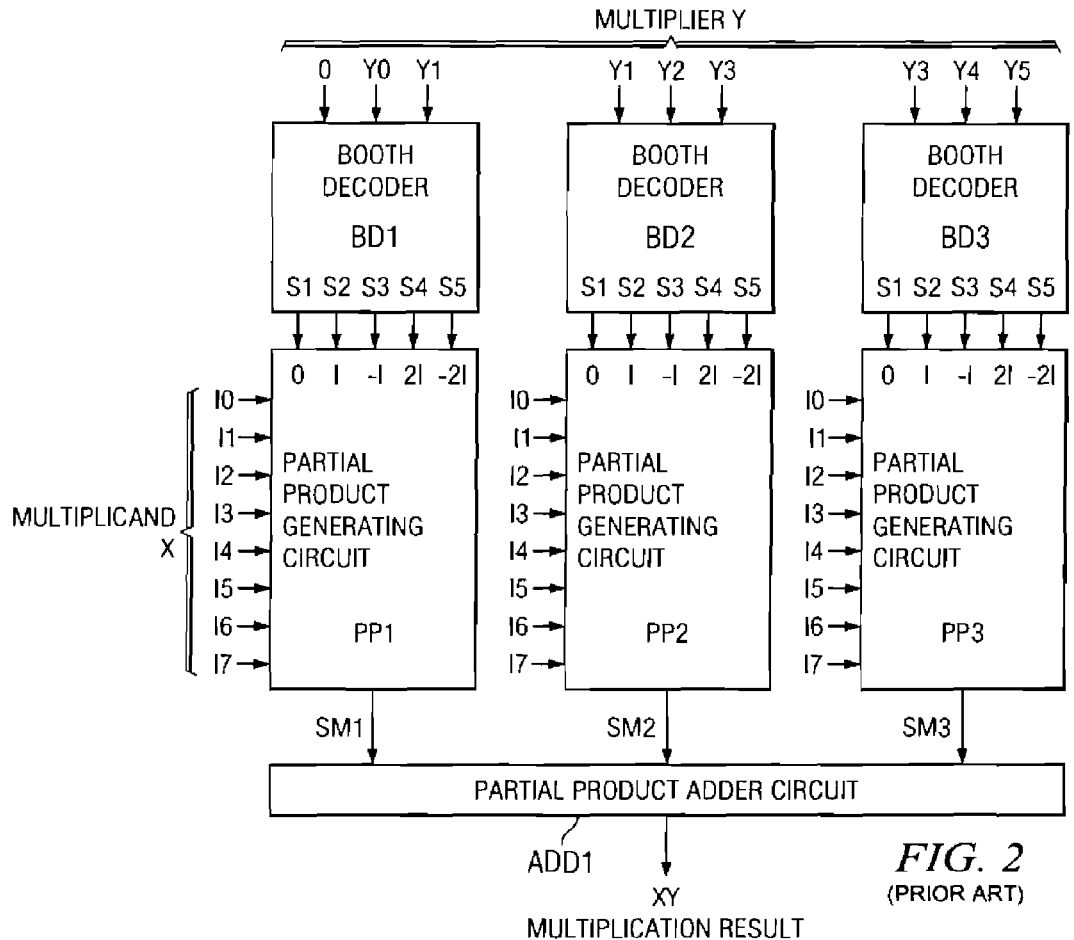
FIG. 2 is an exemplary diagram of a multiplier circuit in accordance with a known mechanism.

With the illustrative embodiments, the negate bits N1, N2, N3, and N4 are fused to the unused areas in the M*8 multiplication engine. Each cycle, the M*8 multiplication engine generates 4 partial products, such as by partial product generating circuitry, e.g., PP1-PP3 in FIG. 2 above. These partial products are input to a 4:2 compressor circuit. The resulting two outputs of the 4:2 compressor circuit are a sum value and a carry-out value. The sum/carry-out value pair is added with the sum/carry-out pair that is stored in staging registers of the M*8 multiplication engine. These staging registers store the sum and carry-out values from a previous cycle. Each cycle, the staging registers are updated with a new sum/carry-out pair and the sum/carry-out value that has been used for accumulation purposes is retired. The final sum/carry-out pairs are added in an adder which generates the final product. The summing of the sum/carry-out value pair with the sum/carry-out value pair of the previous cycle may be performed by an accumulator which itself may comprise a 4:2 compressor with the result being a sum and carry-out value.

Figure 5:
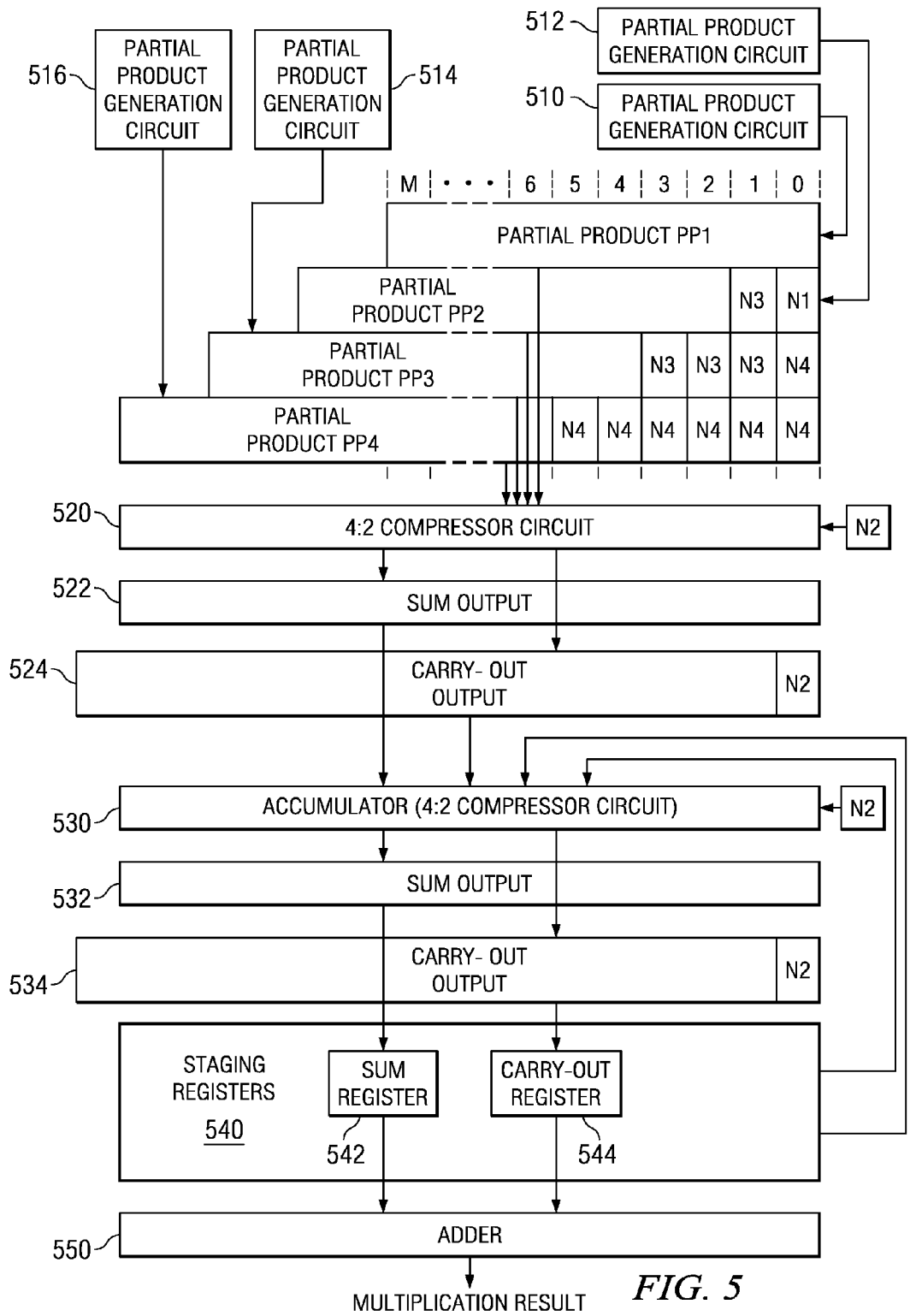
FIG. 5 is an exemplary diagram illustrating a format for adding 4 partial products in accordance with one illustrative embodiment.

FIG. 5 is an exemplary diagram illustrating a format for adding 4 partial products in accordance with one illustrative embodiment. In the example shown in FIG. 5, a M*8 multiplication engine is utilized, where M is the bit size of the multiplicand and the multiplier is an 8 bit value. It should be appreciated that the mechanisms of the illustrative embodiments may be applied to other types of multiplication engines without departing from the spirit and scope of the present invention. The M*8 multiplication engine shown in FIG. 5 may be used in an iterative fashion to achieve an M*N multiplier circuit operation.

As shown in FIG. 5, the partial products PP1-PP4 generated by partial product generation engine, e.g. partial product generation circuits 510-516, are provided to a first 4:2 compressor circuit 520 which outputs a sum output 522 and carry-out output 524. The negate bit N2 is fused with the unused bit at the least significant segment of the carry-out output 524. The negate bits N1, N2, N3 and N4 are determined by the multiplier 3-bit block discussed above with regard to FIG. 1B, for example. When these 3 bits are "100," "101," or "110" the value of the negate bit is "1"; otherwise, the negate bit is "0". The resulting sum output 522 and the carry-out output 524 with the N2 bit value are input to an accumulator 530, which in the depicted example is a second 4:2 compressor.

The accumulator 530 adds the sum output 522 and carry-out output 524 with the N2 bit value, with a sum value and carry-out value from sum register 542 and carry-out register 544 in the staging registers 540. The result is a sum output 532 and carry-out output 534. The negate bit N2 is fused with the unused bit at the least significant segment of the carry-out output 534 and the resulting sum output 532 and carry-out output 534 with the N2 value are stored in sum register 542 and carry-out register 544, respectively.

The sum and carry-out values stored in the sum register 542 and carry-out register 544 are provided to the adder 550 as well as to the accumulator 530. The sum and carry-out values from the staging registers 540 are output to the adder 550 which adds the values from register 542 and carry-out register 544.

Looking at the partial products PP1-PP4 again, the M*8 multiplication engine shown in FIG. 5 utilizes the unused bits at the least significant segments of the 4 partial products PP1, PP2, PP3, and PP4 generated by the partial product generation circuits 510-516 to store the negate bit values N1, N3 and N4. All 4 bits of N2 are placed at the least significant bit, bit<0> of the carry-out outputs of the 4:2 compressor circuit 520 and the accumulator 530. Negate bit values N2 are implemented this way because the preferred position for N2 in FIG. 3 is already taken by N3 in FIG. 5 to obtain the proper output for negate bit N3, as discussed hereafter. The negate bit N2 is aligned with the negate bits N1 and N4 at bit<0> because these negate bits N2, N1 and N4 all have the same weight $2^0$. The negate bit N2 is an input to the 4:2 compressor circuit 520 because the 4:2 compressor circuit 520 has a side carry-in, noted as side_cin in FIG. 6, hereafter. This side_cin has the same weight as N1 and N4 at the bit<0> position in FIG. 5.

That is, the negate bit N3 is duplicated at bit (3), bit (2), and bit (1) in partial product PP3, and bit(1) again in partial product PP2. The arithmetic value of bit N3 is thus $N3*(2^3+2^2+2^1+2^1)=N3*2^4$. This means that the negate bit N3 is arithmetically placed at the bit 4 position. Thus, N3 in FIG. 5 results in the same value as the N3 in FIG. 3. Similarly, N1, N2, and N4 are positioned in FIG. 5 such that their resultant values are the same as for the implementation shown in FIG. 3. For example, notice that in FIG. 5 the negate bit N1 is placed under the bit<0> location. As a result, its weight is $2^0$ and thus, its value is $N1*2^0$. This weight and value is exactly the same as in FIG. 3 above.

It should be noted that the negate bit N3 in FIG. 5 is placed at four locates from bit<3> to bit<1>. The weights of bit<3:1> are $2^3$, $2^2$, and $2^1$, respectively. Thus, these four N3 bits represents the value of $(N3*2^3+N3*2^2+2*N3*2^1)=(N3*2^3+N3*2^2+N3*2^2)=(N3*2^3+2*N3*2^2)=(N3*2^3+N3*2^3)=N3*2^4$. Similarly, the negate bit N3 is placed under bit<4> in FIG. 3 and thus, the value of N3 is $N3*2^4$ in FIG. 3, i.e. the same value as in FIG. 5.

Similarly, the negate bit N4 is duplicated at bit (5), bit (4), bit (3), bit (2), bit (1), and bit (0) in partial product PP4, and bit (0) again in partial product PP3. As a result, the negate bit N4 is arithmetically placed at the bit 6 position, i.e. $N4*(2^5+2^4+2^3+2^2+2^1+2^1)=N4*2^6$. Thus, the seven N4 bits in FIG. 5 produce the value of $N4*2^6$, which is the exact value of the negate bit N4 in bit<6> location in FIG. 3.

In view of the above, it can be seen that negate bits N1, N3, and N4 are correctly placed at the bit 0, bit 4, and bit 6 positions, respectively. The negate bit N2 is treated quite differently, however, and is fused into the accumulator 530 of the M*8 multiplication engine. In FIG. 5 the negate bit N2 is used 4 times at the bit<0> location. This can be expressed as the sum of these four N2 bits, or $4*N2*2^0$, i.e. $N2*2^2$. In FIG. 3, the N2 is placed directly under the bit<2> location. As a result, its weight is $2^2$. Thus, the N2 weight in FIG. 5 matches the N2 weight in the FIG. 3.

As shown in FIG. 5, the negate bit N2 is introduced into the accumulator 530, which in the depicted example is a 4:2 compressor, using 2 unused bits corresponding to the carry-out output value 524 from the 4:2 compressor circuit 520 and the carry-out value from a previous stage at bit (0), which typically has no carry in values from a previous stage. Each of these unused bit inputs are connected to the negate bit N2 value to generate the result N2*2. Utilizing two 4:2 compressors in the M*8 multiplication engine, the result is the term $N2*2^2$, and thus, the negate bit N2 is properly placed in its bit 2 position. In known mechanisms, two 5:2 compressors would be utilized, each 5:2 compressor being larger circuits than the 4:2 compressors shown in the illustrative embodiments.

Thus, by introducing the negate bits N1, N3 and N4 into the unused bits of the least significant portion of the partial products and introducing the negate bit N2 into the unused bits of the least significant portion of the carry-out output values of the 4:2 compressors, the same result as is achieved by the 5:2 compressor based architecture described above is obtained. However, with the multiplier engine of the illustrative embodiments, the size of the circuitry needed to achieve this result is reduced. Moreover, the reduction in circuitry reduces the consumed power of the multiplication engine and increases the speed by which the multiplication engine operates. Thus, a compact high performance and low power multiplication engine is achieved.

Figure 6:
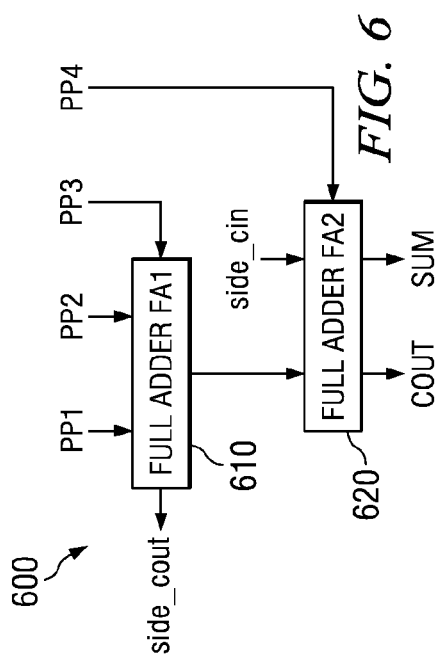
FIG. 6 is an exemplary block diagram of a 4:2 compressor circuit for adding 4 partial products to generate a multiplication result in accordance with one illustrative embodiment.

FIG. 6 is an exemplary block diagram of a 4:2 compressor circuit for adding 4 partial products to generate a multiplication result in accordance with one illustrative embodiment. A similar 4:2 compressor circuit may be provided as the accumulator 530 in FIG. 5 by replacing the inputs PP1-PP4 with the sum and carry-out values from the 4:2 compressor circuit 520 and the sum and carry-out values from the staging registers 540. The 4:2 compressor circuit shown in FIG. 6 is of a single compressor, however typically this 4:2 compressor will be chained together in series with other similar 4:2 compressor circuits to achieve a compressor row, as will be described hereafter.

As shown in FIG. 6, the 4:2 compressor circuit 600 is comprised of two full adders 610 and 620. The first full adder 610 receives as inputs the partial products PP1, PP2 and PP3 and generates a sum value that is output to the second full adder 620. In addition, the first full adder 610 generates a first carry-out value side_cout which is output to a next stage in a compressor row, as will be described with regard to FIG. 7 hereafter.

Figure 7:
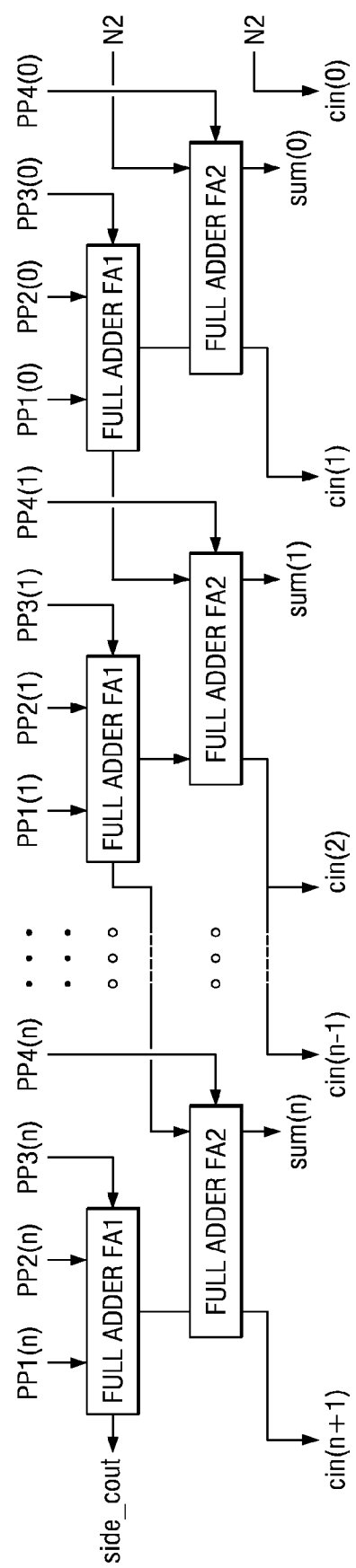
FIG. 7 is an exemplary block diagram illustrating a compressor row in accordance with one illustrative embodiment.

The second full adder 620 receives the sum value from the first full adder 610, the fourth partial product PP4, and a carry-in value which corresponds to the carry-out value from the first full adder of a previous stage in a compressor row, as described hereafter with regard to FIG. 7, as inputs. The second full adder 620 outputs a sum value (sum) and a carry-out value (cout). These values are combined with similar sum and cout values generated in other stages of the compressor row to generate the sum output 522 and carry-out output 524 in FIG. 5.

FIG. 7 is an exemplary block diagram illustrating a compressor row in accordance with one illustrative embodiment. The compressor row shown in FIG. 7 may be used to provide the 4:2 compressor circuit 520 in FIG. 5, for example. A similar compressor row may be utilized to provide the accumulator 530 in FIG. 5 with the inputs being the sum and carry-out bit values from the 4:2 compressor circuit 520 and the sum and carry-out bit values from the staging registers 540 rather than the partial products.

As shown in FIG. 7, each stage of the compressor row is comprised of a first full adder and a second full adder as previously discussed with regard to FIG. 6 above. Each stage handles a particular bit of the partial products, e.g., bit (0) to bit (n). Each stage receives the carry-out values from the first and second full adders of the previous stage as inputs to the second full adder and as a carry in value that is output as part of the carry-out output value 524 in FIG. 5. The only exception to this is the 4:2 compressor that handles bit (0) since there is no side_cin(0) and cin(0) value from a previous stage, i.e. there is no value at bit position −1. These two input bits have the value $2^1$.

The illustrative embodiments utilize these 2 unused bits in the 4:2 compressor to introduce the negate N2 value into the 4:2 compressor to generate the result N2*2. With two of these 4:2 compressors, i.e. a first 4:2 compressor circuit 520 in FIG. 5 and a similar 4:2 compressor circuit used to provide accumulator 530, the multiplication engine creates the term $N2*2^2$. Thus, the N2 negate bit value is properly positioned at the bit 2 position when performing the multiplication operation.

Hence, the N1, N3, and N4 bits are properly utilized by introducing these values into the unused bits of the least significant portion of the partial products which are added by way of the first and second full adders of the 4:2 compressors. The N2 bits are properly utilized by introducing the N2 value into the first stage of compressor row as a carry in value and an input to the second full adder of the first stage of the compressor row. Thus, the same result as would be achieved by a known 5:2 compressor architecture is achieved by the illustrative embodiments while minimizing the size of the circuitry used to achieve this result.

Through use of the illustrative embodiments, a 33% reduction in circuitry in a compressor row or compressor tree may be achieved. That is, since the circuitry of the illustrative embodiments uses 4:2 compressors having only 2 full adders rather than the 5:2 compressors of known architectures which use 3 full adders, the circuitry of the illustrative embodiments is 33% smaller than that of the known architecture. This yields a small and compact design that consumes less power than the known architecture. Moreover, the 4:2 compressor operates at a much faster rate than the 5:2 compressor. Accordingly, a compact high performance and low power multiplier engine is achieved by the illustrative embodiments.

Figure 8:
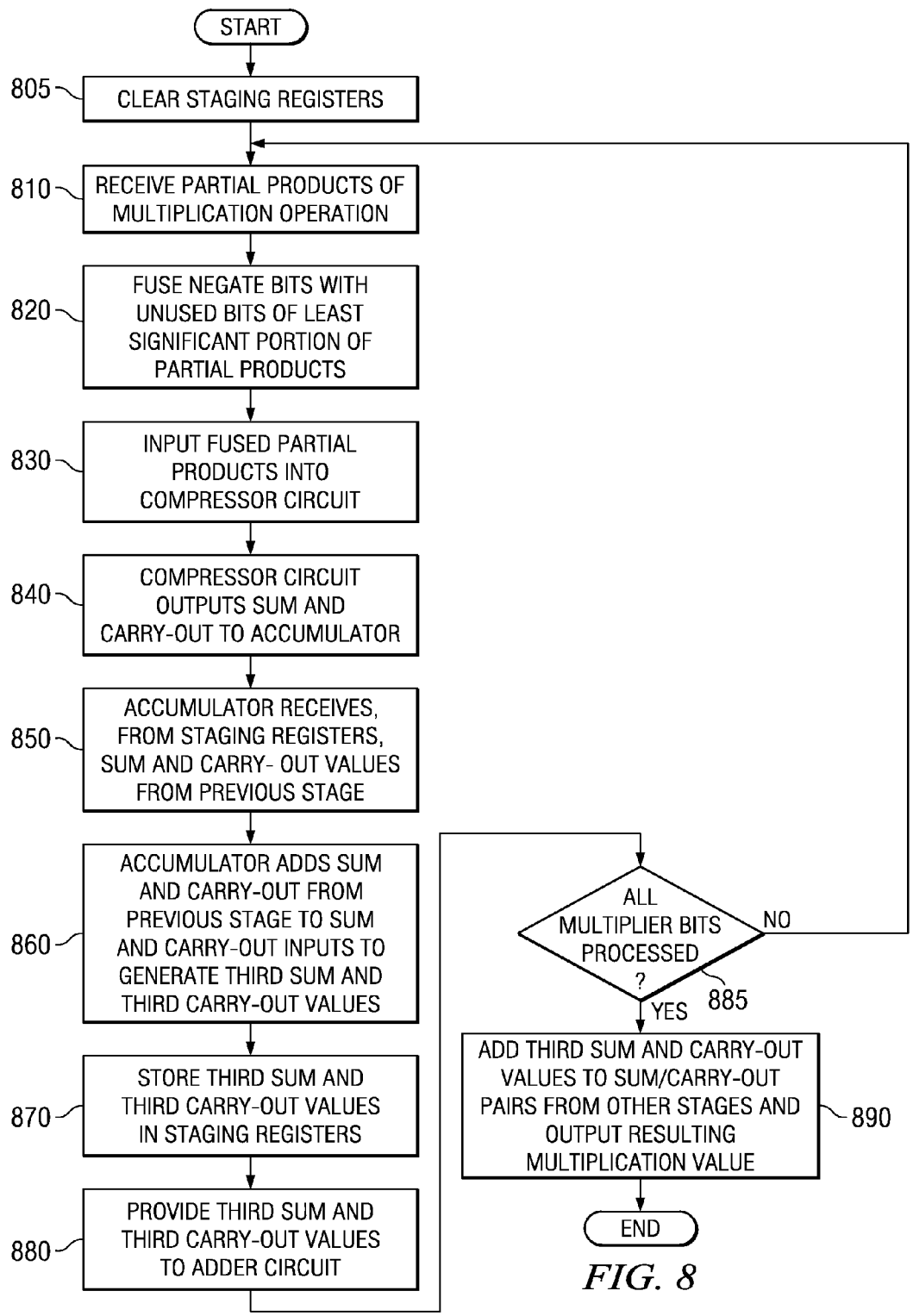
FIG. 8 is a flowchart outlining an exemplary operation of a 4:2 compressor in accordance with one illustrative embodiment.

FIG. 8 is a flowchart outlining an exemplary operation of a multiplier engine in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 8, the operation starts with the staging registers being cleared (step 805). The multiplier engine receives the partial products of a multiplication operation from partial product generation circuits (step 810). The multiplication engine fuses the negate bits with unused bits of a least significant portion of one or more of the partial products (step 820). The multiplication engine inputs the fused partial products into a compressor circuit (step 830).

An additional negate bit value that was not fused into the partial products is input to the compressor circuit and the compressor circuit outputs a sum value and a carry-out value to an accumulator (step 840). The accumulator receives a second sum value and a second carry-out value from staging registers (step 850). The accumulator adds the sum and carry-out value inputs to generate a third sum value and third carry-out value output (step 860). The third sum value and third carry-out value are stored in the staging registers (step 870) and are provided to an adder circuit (step 880).

At this point, 8 bits of multiplier have been processed to form an N+8 bit result. If more multiplier bits need to be processed (step 885), the control will flow back to step 810, where 8 more multiplier bits can be processed, and so on. Finally, when all multiplier bits have been processed, the adder circuit adds the third sum value and third carry-out value to sum/carry-out pairs from other stages (step 890). The operation then terminates.

The circuit as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A multiplication apparatus, comprising:
a compressor circuit;
an accumulator coupled to the compressor circuit; and
an adder circuit coupled to the accumulator, wherein:
the compressor circuit receives two or more partial products of a multiplication operation as inputs, the two or more partial products having at least one first negate bit fused therein,
the compressor circuit adds the two or more partial products with the fused at least one first negate bit to each other to generate a first sum output value and a first carry-out output value that are input to the accumulator,
the accumulator receives the first sum output value, the first carry-out output value, and a second negate bit as inputs and generates a second sum output value and second carry-out output value based on the first sum output value, the first carry-out output value, and the second negate bit, and
the adder circuit generates a multiplication result based on the second sum output value and the second carry out output value,
the at least one first negate bit comprises a first negate bit, a third negate bit, and a fourth negate bit,
the first negate bit is provided at a bit zero position of a second partial product input to the compressor circuit,
the third negate bit is provided at a bit one position of the second partial product and bits three, two, and one of a third partial product input to the compressor circuit, and
the fourth negate bit is provided at a bit zero position of the third partial product and bits five, four, three, two, one, and zero of a fourth partial product input to the compressor circuit.

2. The multiplication apparatus of claim 1, further comprising:
staging registers coupled to the accumulator, wherein the staging registers store the second sum output value and the second carry-out output value that are output by the accumulator.

3. The multiplication apparatus of claim 2, wherein the staging registers output the second sum output value and the second carry-out output value as previous stage inputs to the accumulator, and wherein the accumulator generates the second sum output value and the second carry-out output value based on the previous stage inputs.

4. The multiplication apparatus of claim 2,
wherein the staging registers output the second sum output value and the second carry-out output value to the adder circuit.

5. The multiplication apparatus of claim 1, wherein the at least one first negate bit is fused in the two or more partial products at an unused least significant bit portion of the two or more partial products.

6. The multiplication apparatus of claim 1, wherein the second negate bit is provided at a bit zero position of the second carry-out output value.

7. The multiplication apparatus of claim 1, wherein the second negate bit is input to the compressor circuit, and wherein the compressor circuit adds the second negate bit to the two or more partial products with the fused at least one first negate bit to each other to generate the first sum output value and the first carry-out output value that are input to the accumulator.

8. A method of providing a multiplication apparatus, comprising:
providing a compressor circuit;
providing an accumulator coupled to the compressor circuit; and
providing an adder circuit coupled to the accumulator, wherein:
the compressor circuit receives two or more partial products of a multiplication operation as inputs, the two or more partial products having at least one first negate bit fused therein,
the compressor circuit adds the two or more partial products with the fused at least one first negate bit to each other to generate a first sum output value and a first carry-out output value that are input to the accumulator, and
the accumulator receives the first sum output value, the first carry-out output value, and a second negate bit as inputs and generates a second sum output value and second carry-out output value based on the first sum output value, the first carry-out output value, and the second negate bit, wherein the adder circuit generates a multiplication result based on the second sum output value and the second carry out output value, and wherein the at least one first negate bit comprises a first negate bit, a third negate bit, and a fourth negate bit, and wherein:
the first negate bit is provided at a bit zero position of a second partial product input to the compressor circuit,
the third negate bit is provided at a bit one position of the second partial product and bits three, two, and one of a third partial product input to the compressor circuit, and
the fourth negate bit is provided at a bit zero position of the third partial product and bits five, four, three, two, one, and zero of a fourth partial product input to the compressor circuit.

9. The method of claim 8, further comprising:
providing staging registers coupled to the accumulator, wherein the staging registers store the second sum output value and the second carry-out output value that are output by the accumulator; and
providing an adder circuit coupled to the staging registers, wherein the staging registers output the second sum output value and the second carry-out output value to the adder circuit, and wherein the adder circuit generates a multiplication result based on the second sum output value and the second carry-out output value.

10. The method of claim 9, wherein the staging registers output the second sum output value and the second carry-out output value as previous stage inputs to the accumulator, and wherein the accumulator generates the second sum output value and the second carry-out output value based on the previous stage inputs.

11. The method of claim 8, wherein the second negate bit is provided at a bit zero position of the second carry-out output value, and wherein:
the second negate bit is input to the compressor circuit, and the compressor circuit adds the second negate bit to the two or more partial products with the fused at least one first negate bit to each other to generate the first sum output value and the first carry-out output value that are input to the accumulator.

12. A method, in a data processing device, for generating a multiplication result, comprising:

receiving, in a compressor circuit, two or more partial products of a multiplication operation, the two or more partial products having at least one first negate value fused therein;

adding, in the compressor circuit, the two or more partial products with the fused at least one first negate value to each other to generate a first sum and a first carry-out output value;

accumulating, in an accumulator circuit, the first sum output value, the first carry-out output value, a second negate bit, a second sum output value from a first staging register, and a second carry-out output value from a second staging register; and generating a multiplication result based on the accumulated first sum output value, first carry-out output value, second negate bit, second sum output value, and second carry-out output value, wherein the at least one first negate bit comprises a first negate bit, a third negate bit, and a fourth negate bit, and wherein:

the first negate bit is provided at a bit zero position of a second partial product input to the compressor circuit, the third negate bit is provided at a bit one position of the second partial product and bits three, two, and one of a third partial product input to the compressor circuit, and the fourth negate bit is provided at a bit zero position of the third partial product and bits five, four, three, two, one, and zero of a fourth partial product input to the compressor circuit.

13. The method of claim 12, further comprising:

adding the second sum output value and the second carry-out output value in an adder circuit, wherein the adder circuit outputs the multiplication result based on the addition of the second sum output value and the second carry-out output value.

14. The method of claim 12, wherein the at least one first negate bit is fused in the two or more partial products at an unused least significant bit portion of the two or more partial products.

15. The method of claim 12, wherein the second negate bit is provided at a bit zero position of the second carry-out output value.

16. The method of claim 12, wherein the second negate bit is input to the compressor circuit, and wherein the compressor circuit adds the second negate bit to the two or more partial products with the fused at least one first negate bit to each other to generate the first sum output value and the first carry-out output value that are input to the accumulator.

* * * * *